(12) United States Patent
Hoek

(10) Patent No.: US 10,202,071 B2
(45) Date of Patent: Feb. 12, 2019

(54) MOUNTING BRACKET, VEHICULAR APPROACH LIGHTING ASSEMBLY AND METHOD FOR INSTALLING THE SAME

(71) Applicant: Steven G. Hoek, Holland, MI (US)

(72) Inventor: Steven G. Hoek, Holland, MI (US)

( * ) Notice: Subject to any disclaimer, the term of this patent is extended or adjusted under 35 U.S.C. 154(b) by 0 days.

(21) Appl. No.: 15/836,029

(22) Filed: Dec. 8, 2017

(65) Prior Publication Data

US 2018/0162266 A1    Jun. 14, 2018

Related U.S. Application Data

(60) Provisional application No. 62/432,220, filed on Dec. 9, 2016.

(51) Int. Cl.
| | | |
|---|---|---|
| *B60Q 1/24* | (2006.01) | |
| *B60Q 1/32* | (2006.01) | |
| *B60R 3/00* | (2006.01) | |
| *B62D 65/16* | (2006.01) | |
| *B60Q 1/26* | (2006.01) | |

(52) U.S. Cl.
CPC ............ *B60Q 1/323* (2013.01); *B60Q 1/32* (2013.01); *B60R 3/002* (2013.01); *B62D 65/16* (2013.01); *B60Q 1/2603* (2013.01); *B60Q 1/2696* (2013.01)

(58) Field of Classification Search
CPC ........ B60Q 1/323; B60Q 1/32; B60Q 1/2696; B60Q 1/2603; B62D 65/16; B60R 3/002
See application file for complete search history.

(56) References Cited

U.S. PATENT DOCUMENTS

| | | |
|---|---|---|
| 4,311,320 A | 1/1982 | Waters, Jr. |
| 4,456,275 A | 6/1984 | Synder et al. |
| 4,463,962 A | 8/1984 | Synder |
| 4,935,638 A | 6/1990 | Straka |
| 5,193,829 A | 3/1993 | Holloway et al. |
| 5,511,750 A | 4/1996 | Evenson |
| 5,601,300 A | 2/1997 | Fink et al. |
| 5,769,439 A | 6/1998 | Thompson |
| 5,895,064 A | 4/1999 | Laubach |
| 6,547,478 B1 | 4/2003 | Lin |
| 6,581,946 B2 | 6/2003 | Lund et al. |
| 7,287,770 B2 | 10/2007 | Drabant et al. |
| 7,311,320 B2 | 12/2007 | Kuntze et al. |
| 8,013,728 B2 * | 9/2011 | Carpenter ............ B60Q 1/0088 340/440 |
| 8,528,925 B2 | 9/2013 | McFarlane |
| 9,452,713 B2 | 9/2016 | Stickles |
| 9,539,947 B1 | 1/2017 | Jensen et al. |
| 2006/0266780 A1 | 11/2006 | Armstrong et al. |
| 2009/0075557 A1 * | 3/2009 | Arriola ................ A63H 17/268 446/438 |

FOREIGN PATENT DOCUMENTS

| | | | |
|---|---|---|---|
| CN | 106915456 A | * 7/2017 | |
| GB | 685718 A | * 1/1953 | ............. F16K 47/10 |

* cited by examiner

*Primary Examiner* — Ali Alavi
(74) *Attorney, Agent, or Firm* — King & Partners, PLC

(57) ABSTRACT

A mounting bracket sub-assembly used to mount a vehicular approach lighting assembly including a base member, wherein the base member is adapted for securement to a drain aperture located on an undercarriage of a vehicle body, a cover member, wherein the cover member mates with the base member to secure a vehicular approach lighting assembly, and at least one fastener, wherein the at least one fastener releasably secures the cover member to the base member.

20 Claims, 8 Drawing Sheets

MOUNTING BRACKET, VEHICULAR APPROACH LIGHTING ASSEMBLY AND METHOD FOR INSTALLING THE SAME

CROSS-REFERENCE TO RELATED APPLICATIONS

This application claims the benefit of U.S. Provisional Patent Application Ser. No. 62/432,220, filed Dec. 9, 2016, entitled "Mounting Bracket for Automotive Light"—which is hereby incorporated herein by reference in its entirety, including all references and appendices cited therein.

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

1. Field of the Invention

The present invention relates in general to mounting brackets and, more particularly, to mounting brackets for use with low-profile vehicular approach lighting assemblies. The present invention further relates to methods for efficiently installing approach lighting assemblies onto vehicles using one or more mounting brackets.

2. Background Art

Mounting brackets associated with vehicles have been known in the art for years and are the subject of a plurality of patents and publications, including: U.S. Pat. No. 9,539,947 entitled "Running Board Bracket," U.S. Pat. No. 9,452,713 entitled "Universal Linkage Mounting Bar," U.S. Pat. No. 6,547,478 entitled "Coupling Plate Frame," U.S. Pat. No. 5,895,064 entitled "Universal Mounting Bracket for Running Boards," U.S. Pat. No. 5,601,300 entitled "Vehicle Frame Mounting Bracket System," U.S. Pat. No. 5,511,750 entitled "Mounting Brackets for Motor Vehicle Running Boards," U.S. Pat. No. 5,193,829 entitled "Sub Frame Support System and Running Board for a Vehicle," U.S. Pat. No. 4,935,638 entitled "Side Bar Assembly for Vehicles Such as Pick-Up Trucks, Off-Road Vehicles and the Like," U.S. Pat. No. 4,311,320 entitled "Running Board Assembly Having a Universal Mounting Bracket," and United States Patent Application Publication Number 2006/0266780 entitled "Universal Running Board Mounting Bracket"—all of which are hereby incorporated herein by reference in their entirety including all references cited therein.

U.S. Pat. No. 9,539,947 appears to disclose a running board assembly for a vehicle including a running board and a plurality of brackets for connecting the running board to a rocker. The brackets include first and second planar supports extending downward and laterally outward from the rocker to the running board. The planar supports are spaced apart from each other and are disposed in a vertical/transverse plane. The first and second planar supports are disposed parallel to each other and form a parallelogram connecting the running board to the rocker that deflects in a longitudinal direction when impacted from the side in an impact. The running board assembly includes a mounting plate attached to the rocker that defines a plurality of longitudinally extending slots. The first and second planar supports are secured to the mounting plate with a first set of fasteners that are received in the slots.

U.S. Pat. No. 9,452,713 appears to disclose a modular mounting system for running board assemblies including at least one universal mounting bar and at least one universal mounting arrangement for connecting to a body panel of a motor vehicle. The universal mounting bar includes at least a first plurality of apertures which correlate to mounting apertures in the vehicle body panel, and a second plurality of apertures which correspond to mounting apertures in a second discreet vehicle body panel, and a third plurality of apertures which correspond to mounting apertures in a third discreet vehicle body panel. The universal mounting bar provides a single bar that accommodates various aperture locations for body panels on any number of predetermined vehicle brands/models. Each universal mounting arrangement has at least one fifth plurality of apertures for connecting to each of a fourth plurality of apertures at predetermined locations on the universal mounting bar.

U.S. Pat. No. 6,547,478 appears to disclose a coupling plate frame that is integrally made of hardened high molecular material and comprises a top plate section a vertical plate section, a bottom plate section, and two flap plates. The top plate section has an engaging hole thereon. The vertical plate section is integrally associated with the top plate with a width gradually reduced from a top to a bottom thereof, and has an engaging hole near the bottom thereof. The bottom plate section is attached integrally to the vertical plate section extending outward and opposite to the top plate section from the vertical section plate. Each of the flap plates is integrally attached to the top plate section, the vertical plate section, and the bottom plate section, respectively. Each flap plate is slanted at the top plate section and extends downward along the vertical plate, and the width between the flap plates is gradually smaller from a top thereof to a bottom thereof. Two of the coupling plates can be lapped to each other without occupying extra space.

U.S. Pat. No. 5,895,064 appears to disclose a universal mounting bracket that includes a pair of upper and lower generally L-shaped legs connected together along their backs to permit slidable length adjustment between the upper and lower feet of the legs. A hanger is connected to the back and secured to an inward surface of a rocker panel to support the hanger with the upper foot in contact with the vehicle floor board and the lower foot projecting horizontally outwardly from below the rocker panel to support a running board thereon. The upper and lower legs of the bracket have the feet connected to the back portion at an angle greater than 90° relative to the horizontal, such that adjustment of the length of the backs will move the lower foot both horizontally and vertically relative to the upper foot. A running board is secured to the lower foot of the bracket, and has a back wall which is secured to the bottom wall of the rocker panel.

U.S. Pat. No. 5,601,300 appears to disclose a bracket assembly for attachment to a motor vehicle frame member that is adapted to support a frame mounted vehicle accessory, such as a step or running board. The bracket assembly comprises a pair of primary brackets, a pair of connecting pins, a support member, a mounting bracket, and a leveling bracket. The primary brackets define surfaces engaging a vehicle frame member without drilling. The connecting pins extend between and connect the primary brackets. The support member is substantially vertical and is supported by the primary brackets and connecting pins. The mounting bracket extends substantially horizontally from the support member to the accessory. The leveling bracket is fixed to the mounting bracket at a point proximate to the accessory and is fixed to the support member at a point separate from where the mounting bracket attaches to the support member.

U.S. Pat. No. 5,511,750 appears to disclose a bracket for retro fitting running boards to existing motor vehicles that comprises a rigid Z-shaped, main body which is connected at an upper end to the underside of the vehicle and at a lower end to a running board. A relatively flexible strap which extends upwardly from the lower portion of the Z-shaped body is connected to the rocker panel of the vehicle body.

U.S. Pat. No. 5,193,829 appears to disclose a running board removably mounted to a vehicle on a sub frame support system. The sub frame support system has brackets adjustably mounted to the vehicle frame which support a receiving frame. The receiving frame is adjustably mounted to the brackets and has a pair of sockets for receiving the supporting members of the running board. The running board is a structural member having shaped support members extending from its ends and configured to mount in the sockets of the receiving frame. The running board is mounted to the vehicle by inserting the supporting members of the running board into the sockets of the receiving frame. Pins retain the support members in the sockets. The running board is removed from the vehicle by merely removing the pins and removing the running board from the receiving frame.

U.S. Pat. No. 4,935,638 appears to disclose a side bar assembly for attachment to a chassis of different sizes of pick-up trucks, the side bar assembly including a pair of substantially L-shaped tubular members forming half-bar tube sections to collectively form a generally U-shaped side bar to extend laterally from a side of the vehicle, and a cylindrical connector sleeve having a central bore corresponding substantially to the outer diameter of the tube legs to receive the latter therein in alignment with each other with the connector sleeve encircling the adjacent portions of the tube legs over more than half the circumferential extent of each and a pair of mounting brackets to receive end portions of the side bar legs therein. The connector sleeve also includes a thickened portion defining an upwardly facing flat step surface at the top of the sleeve.

U.S. Pat. No. 4,311,320 appears to disclose a running board assembly for a vehicle that includes a running board plate which has an upturned lip on one edge thereof and a downturned lip on the opposite edge. A splash guard is mounted on the forward end of the plate and extends into the wheel well of the vehicle. A pair of universal mounting brackets are interchangeable between sides of the vehicle to adapt a single size running board to fit the vehicle which has either of two spacing distances between mounting points thereof. The running board plate has longitudinal ridges and elastomeric strips which provide both transverse and longitudinal traction.

United States Patent Application Publication Number 2006/0266780 appears to disclose a series of brackets that have a universal base, but have unique mounting features which are used to mount a running board onto a vehicle's inner rocker panel. The running boards have a support which has a universal mounting surface that can accept the bracket's universal base in order for the bracket to attach to the support. The top of the bracket can be shaped differently in order to avoid obstructions on the vehicle's inner rocker panel. Therefore, the running board can be mounted easier because the top of the bracket can be shaped to avoid the inner rocker panel's obstructions and the bottom can be formed to the universal shape in order to fit the running board's support.

While mounting brackets and associated accessories, as disclosed hereinabove, have been known in the art for years, issues associated with both efficient and secure mounting of, for example, vehicular approach lighting assemblies using mounting brackets remain problematic and/or unresolved. As such, there remains a genuine demand for mounting brackets and associated approach lighting assemblies that are securely and efficiently (e.g., less than approximately 15 minutes) installed onto a vehicle as a manufacturer installed option, a port installed option, a dealer installed option, and/or a third party aftermarket installed option.

These and other objects of the present invention will become apparent in light of the present specification, claims, and drawings.

SUMMARY OF THE INVENTION

The present invention is directed to a mounting bracket sub-assembly used to mount a vehicular approach lighting assembly comprising, consisting essentially of, and/or consisting of: (a) a base member, wherein the base member is adapted for securement to a drain aperture located on an undercarriage of a vehicle body; (b) a cover member, wherein the cover member mates with the base member to secure a vehicular approach lighting assembly; and (c) at least one fastener, wherein the at least one fastener releasably secures the cover member to the base member.

In a preferred embodiment of the present invention, the base member, from an installed perspective, includes a top wall having an inner surface and an outer surface, a left side wall having an inner surface and an outer surface, a right side wall having an inner surface and an outer surface, a bottom wall having an inner surface and an outer surface, and a locking tab having an inner surface and an outer surface, wherein the locking tab emanates from the right side wall.

In another preferred embodiment of the present invention, the base member further includes at least one lock-washer tab having an inner surface and an outer surface, and wherein the at least one lock-washer tab is adapted to be positioned through a drain aperture located on an undercarriage of a vehicle body.

In yet another preferred embodiment of the present invention, the base member further includes a pair of lock-washer tabs having inner surfaces and outer surfaces, and wherein the pair of lock-washer tabs are adapted to be positioned through a drain aperture located on an undercarriage of a vehicle body.

In another aspect of the present invention, the top wall of the base member includes a sloped annular sidewall that defines an aperture for flush or sub-flush securing of a threaded fastener therein.

In a preferred embodiment of the present invention, the lower/bottom wall of the base member includes an aperture for securing a threaded fastener therein.

In another preferred embodiment of the present invention, the cover member includes a bottom wall having an inner surface and an outer surface, a step positioned between a left region/segment and a right region/segment, a right side wall having an inner surface and an outer surface, and a step positioned between an upper region/segment and a lower region/segment.

In yet another preferred embodiment of the present invention, the left region/segment of the bottom wall of the cover member includes an aperture for securing a threaded fastener therein.

In accordance with the present invention, the upper region/segment of the right side wall of the cover member includes an aperture for receiving a locking tab of the base member.

In a preferred embodiment of the present invention, the bottom wall of the cover member includes an aperture positioned between the two steps for enabling light to transmit therethrough.

The present invention is also directed to a vehicular approach lighting assembly comprising, consisting essentially of, and/or consisting of: (a) a bracket sub-assembly as is disclosed herein; and (b) a light sub-assembly comprising; (1) a light element extending for a length and configured to project light in an outward direction; (2) a translucent jacket positioned exterior to and surrounding at least a portion of the light element, the translucent jacket having a hollow interior and an opening at each end; and (3) an outer housing extending for a length and positioned exterior to and surrounding at least a portion of the translucent jacket.

In a preferred embodiment of the present invention, the lighting sub-assembly further comprises one or more reflectors positioned within the translucent jacket.

In another preferred embodiment of the present invention, the light element comprises a flexible LED linear light.

In yet another preferred embodiment of the present invention, the translucent jacket is fabricated from a thermoplastic. In this embodiment, the thermoplastic preferably comprises an aliphatic polyamide and/or a semi-aromatic polyamide.

In another aspect of the present invention, the translucent jacket is preferably fabricated from an acrylate, a poly (methyl methacrylate), an acrylic, a polycarbonate, an acrylonitrile butadiene styrene, a copolyester, a polystyrene, a high impact polystyrene, a polyphenylene oxide, a polyethylene terephthalate, a polyethylene, a polyvinyl chloride, a polypropylene, and/or a polylactic acid.

In a preferred embodiment of the present invention, the outer housing is fabricated from aluminum.

The present invention is further directed to a method for installing a vehicular approach lighting assembly onto an undercarriage of a vehicle body, comprising the steps of: (a) providing at least two bracket sub-assemblies as disclosed herein; (b) securing the at least two bracket sub-assemblies to the undercarriage of a vehicle body through a plurality of drain apertures; and (c) securing a light sub-assembly, as disclosed herein, within the at least two bracket sub-assemblies.

BRIEF DESCRIPTION OF THE DRAWINGS

Certain embodiments of the present invention are illustrated by the accompanying figures. It will be understood that the figures are not necessarily to scale and that details not necessary for an understanding of the invention or that render other details difficult to perceive may be omitted. It will be further understood that the invention is not necessarily limited to the particular embodiments illustrated herein.

The invention will now be described with reference to the drawings wherein.

DETAILED DESCRIPTION OF THE INVENTION

Figure 1:
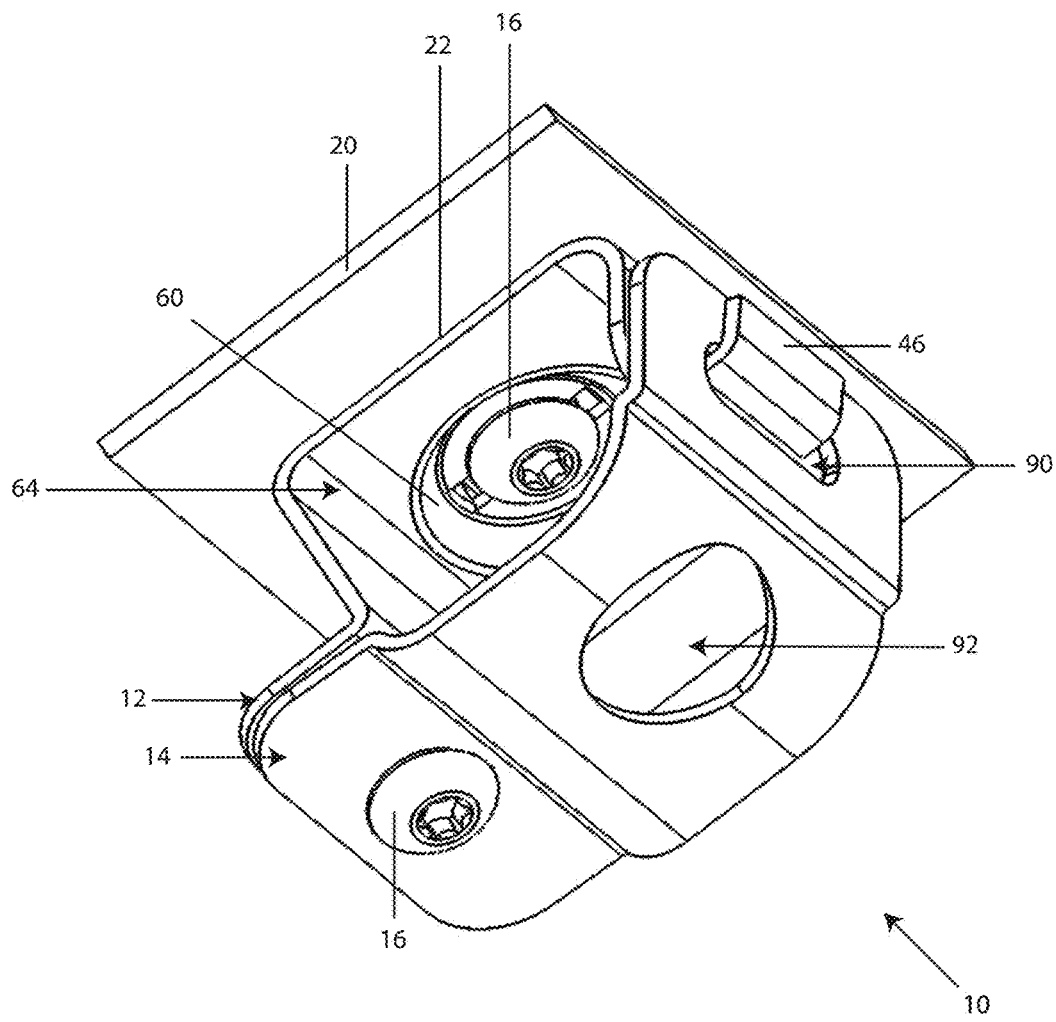
FIG. 1 of the drawings is an isometric view of a mounting bracket manufactured in accordance with the present invention secured to vehicle sheet metal.

While this invention is susceptible of embodiment in many different forms, there is disclosed and described herein in detail several specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings by like reference characters. In addition, it will be understood that the drawings are merely schematic representations of one or more embodiments of the invention, and some of the components may have been distorted from their actual scale for purposes of pictorial clarity.

Referring now to the drawings and, more particularly, to FIGS. 1-4, mounting bracket sub-assembly 10 is shown, which generally comprises base member 12, cover member 14, and fastener 16.

Figure 5:
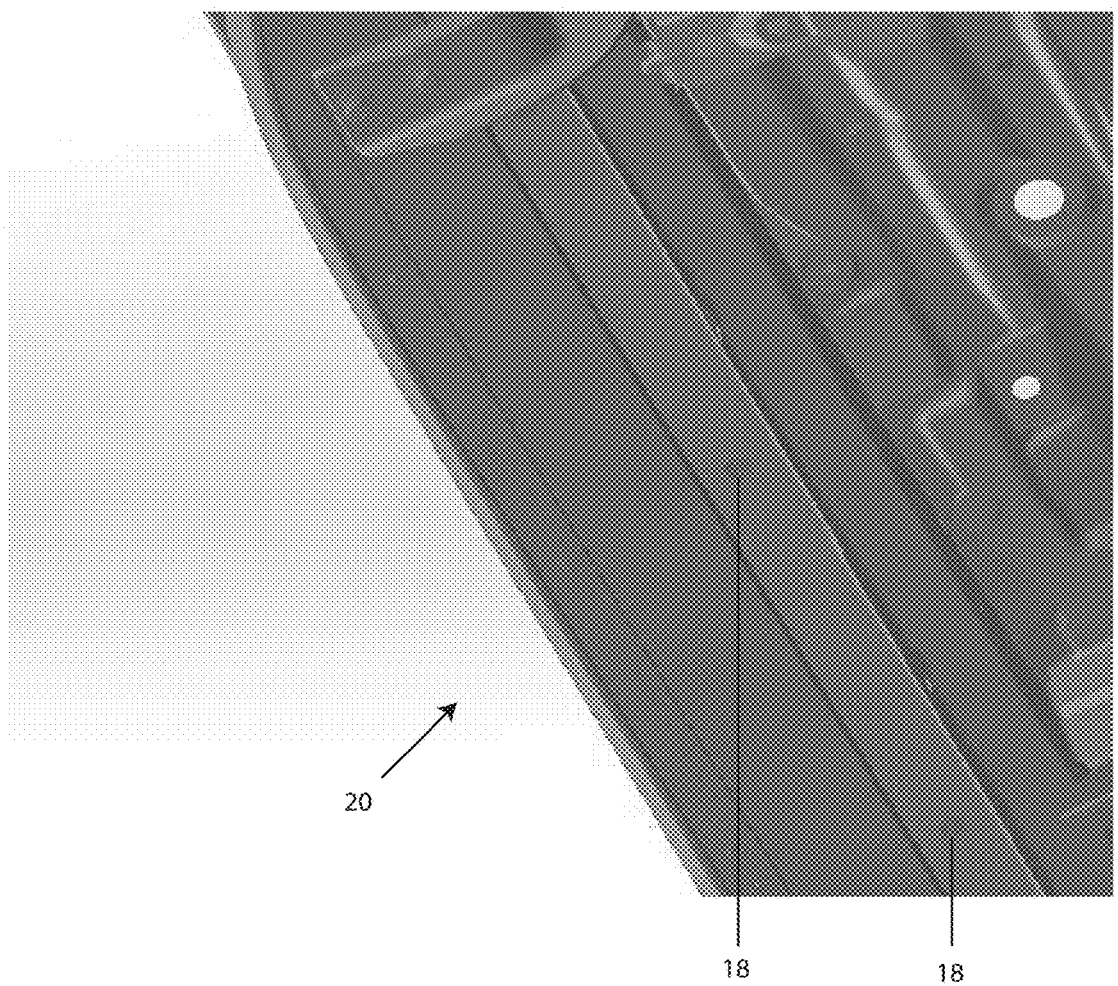
FIG. 5 of the drawings is an isometric view of the undercarriage of a typical automobile showing, among other things, body drain apertures that are utilized to secure the mounting brackets of the present invention during installation of the vehicular approach lighting assembly.

In a preferred embodiment of the present invention, base member 12 is adapted for securement to drain aperture 18 located on an undercarriage of vehicle body 20 (See FIG. 5). From an installed perspective, base member 12 preferably includes top wall 22 having inner/lower surface 24 and outer/upper surface 26, left side wall 28 having inner surface 30 and outer surface 32, right side wall 34 having inner surface 36 and outer surface 38, bottom wall 40 having inner/lower surface 42 and upper/outer surface 44, and locking tab 46 having inner surface 48 and outer surface 50. Locking tab 46 preferably emanates contiguously from right side wall 34.

As is best shown collectively in FIGS. 1-4, base member 12 preferably includes one or more lock-washer tabs 52 having inner surfaces 54 and outer surface 56. It will be understood that at least one lock-washer tab 52 is adapted to be positioned through, for example, drain aperture 18 located on the undercarriage of vehicle body 20. The lock-washer tab(s) fix locker washer 58 in position so that fastener 16, in cooperation with nut 62, secures base member 12 of mounting bracket 10 to vehicle body 20.

Referring now to FIG. 1, top wall 22 of base member 12 includes sloped annular sidewall 60 the inner peripheral geometry of which defines an aperture for flush or sub-flush securing of threaded fastener 16 therein.

Bottom wall 40 of base member 12 includes an aperture for receiving threaded fastener 16 therein.

Base member 12 is preferably fabricated from steel, stainless steel, aluminum, transition metals, and/or alloys of the same, natural and/or synthetic plastics, and/or composites of the same.

Figure 2:
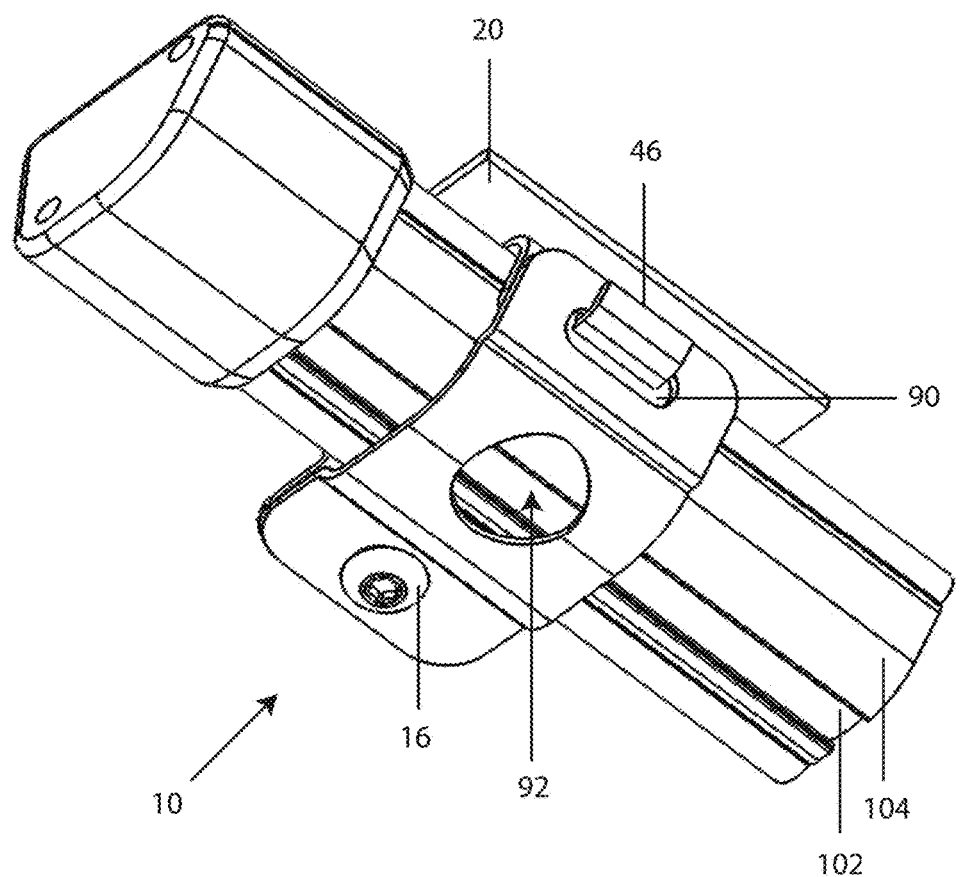
FIG. 2 of the drawings is an isometric view of a vehicular approach lighting assembly manufactured in accordance with the present invention secured to vehicle sheet metal via the mounting bracket of FIG. 1.
Figure 3:
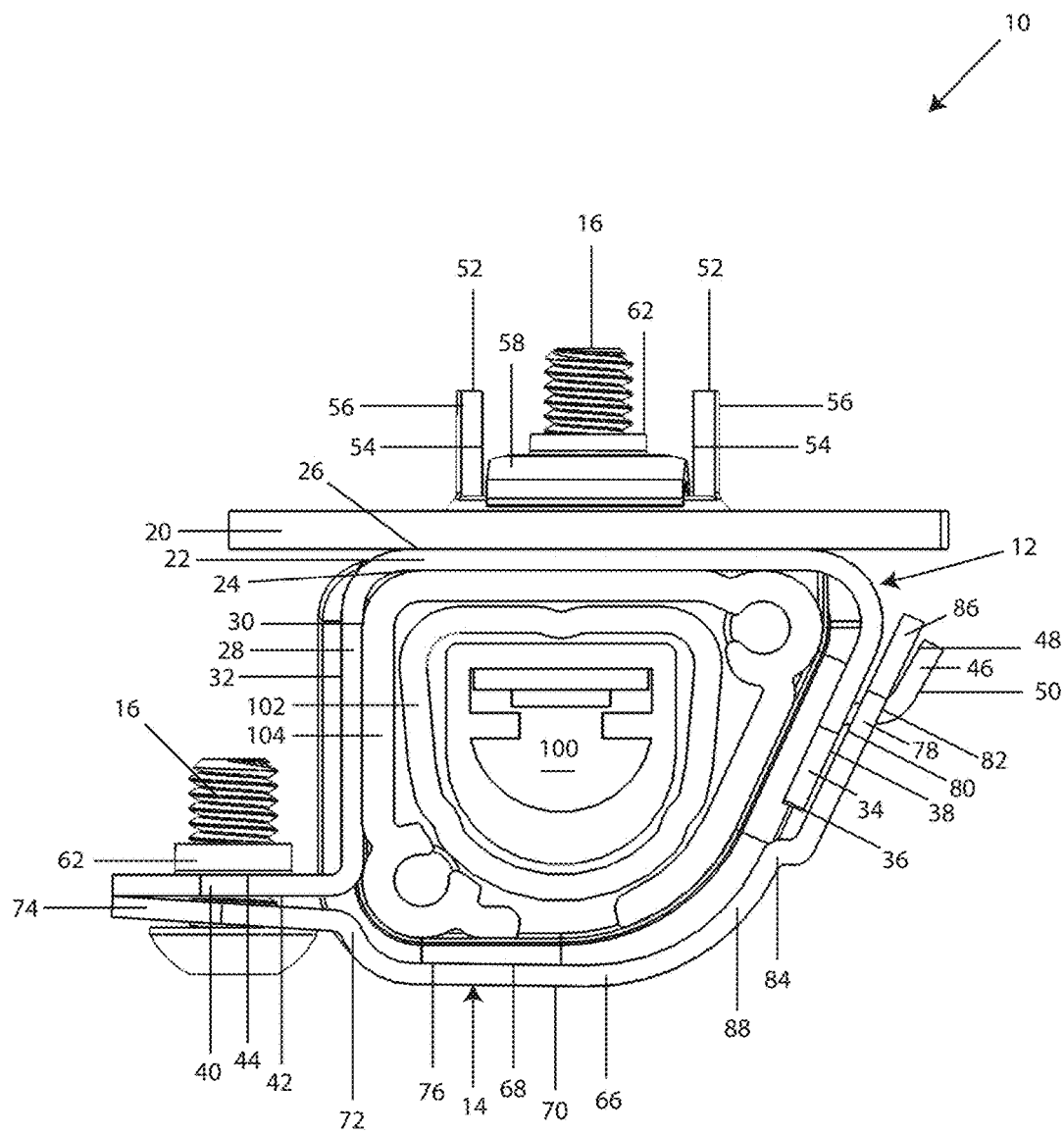
FIG. 3 of the drawings is a side view of a vehicular approach lighting assembly manufactured in accordance with the present invention secured to vehicle sheet metal via the mounting bracket of FIG. 1.
Figure 4:
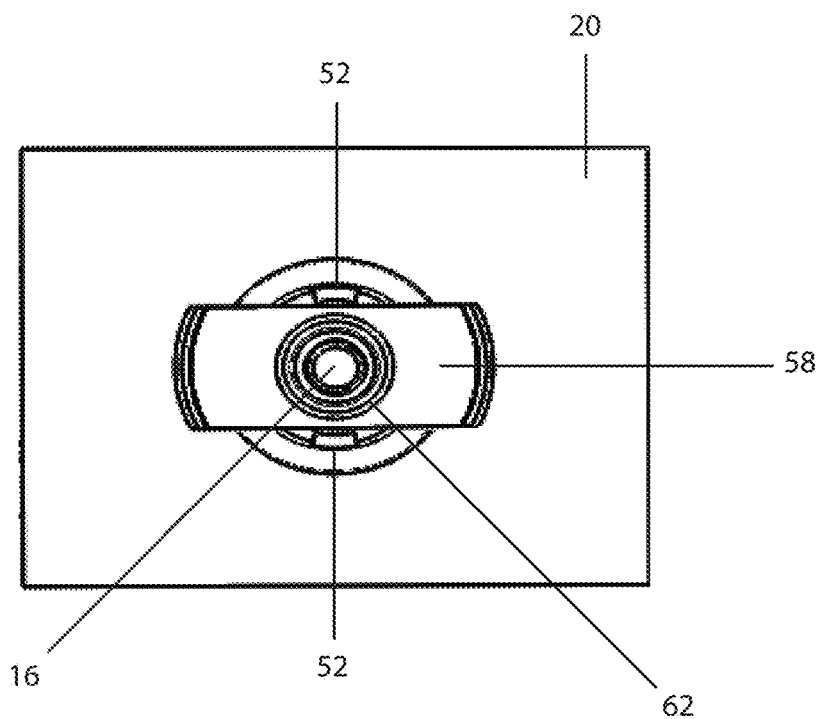
FIG. 4 of the drawings is a fragmented top plan view of the mounting bracket of FIG. 1.

Referring now to FIGS. 1-3, cover member 14 cooperatively interacts/mates with base member 12 to define containment region 64 which secures a vehicular approach lighting assembly therein.

Cover member 14 preferably includes bottom wall 66 having inner/upper surface 68 and outer/lower surface 70, step 72 positioned between left portion/segment 74 and right segment 76, right side wall 78 having inner surface 80 and outer surface 82, and step 84 positioned between upper portion/segment 86 and lower segment 88.

Left segment 74 of bottom wall 66 of cover member 14 includes an aperture for receiving threaded fastener 16 therein. Threaded fastener 16 releasably secures, in cooperation with locking tab 46, cover member 14 to base member 12.

As is best shown in FIGS. 1-2, upper segment 86 of right side wall 78 of cover member 14 includes slot/aperture 90 for receiving locking tab 46 of base member 12.

In a preferred embodiment of the present invention, bottom wall 66 of cover member 14 includes aperture 92 positioned between the steps 72 and 84 for enabling light to transmit therethrough.

Cover member 14 is preferably fabricated from steel, stainless steel, aluminum, transition metals, and/or alloys of the same, natural and/or synthetic plastics, and/or composites of the same.

The present invention is also directed a vehicular approach lighting assembly comprising bracket sub-assembly 10 as is disclosed herein, and a light sub-assembly.

As is best shown in FIGS. 2-3, the light sub-assembly preferably includes light element 100 (e.g., flexible LED linear light) extending for a length and configured to project light in an outward direction, translucent jacket 102 positioned exterior to and surrounding at least a portion of light element 100, translucent jacket 102 having a hollow interior and an opening at each end, and outer housing 104 extending for a length and positioned exterior to and surrounding at least a portion of translucent jacket 102. Light element 100, translucent jacket 102, and outer housing 104 may comprise a plurality of configurations, including those disclosed in U.S. Patent Application Publication Number 2016/0176336 entitled "Diffused Flexible LED Linear Light Assembly," which is hereby incorporated herein by reference in its entirety including all references cited therein.

In accordance with the present invention, translucent jacket 102 is preferably fabricated from a thermoplastic, such as an aliphatic polyamide and/or a semi-aromatic polyamide. Translucent jacket 102 may also be fabricated from, for example, an acrylate, a poly(methyl methacrylate), an acrylic, a polycarbonate, an acrylonitrile butadiene styrene, a copolyester, a polystyrene, a high impact polystyrene, a polyphenylene oxide, a polyethylene terephthalate, a polyethylene, a polyvinyl chloride, a polypropylene, and/or a polylactic acid.

Outer housing 104 is preferably fabricated from steel, stainless steel, aluminum, transition metals, and/or alloys of the same, natural and/or synthetic plastics, and/or composites of the same.

Figure 6:
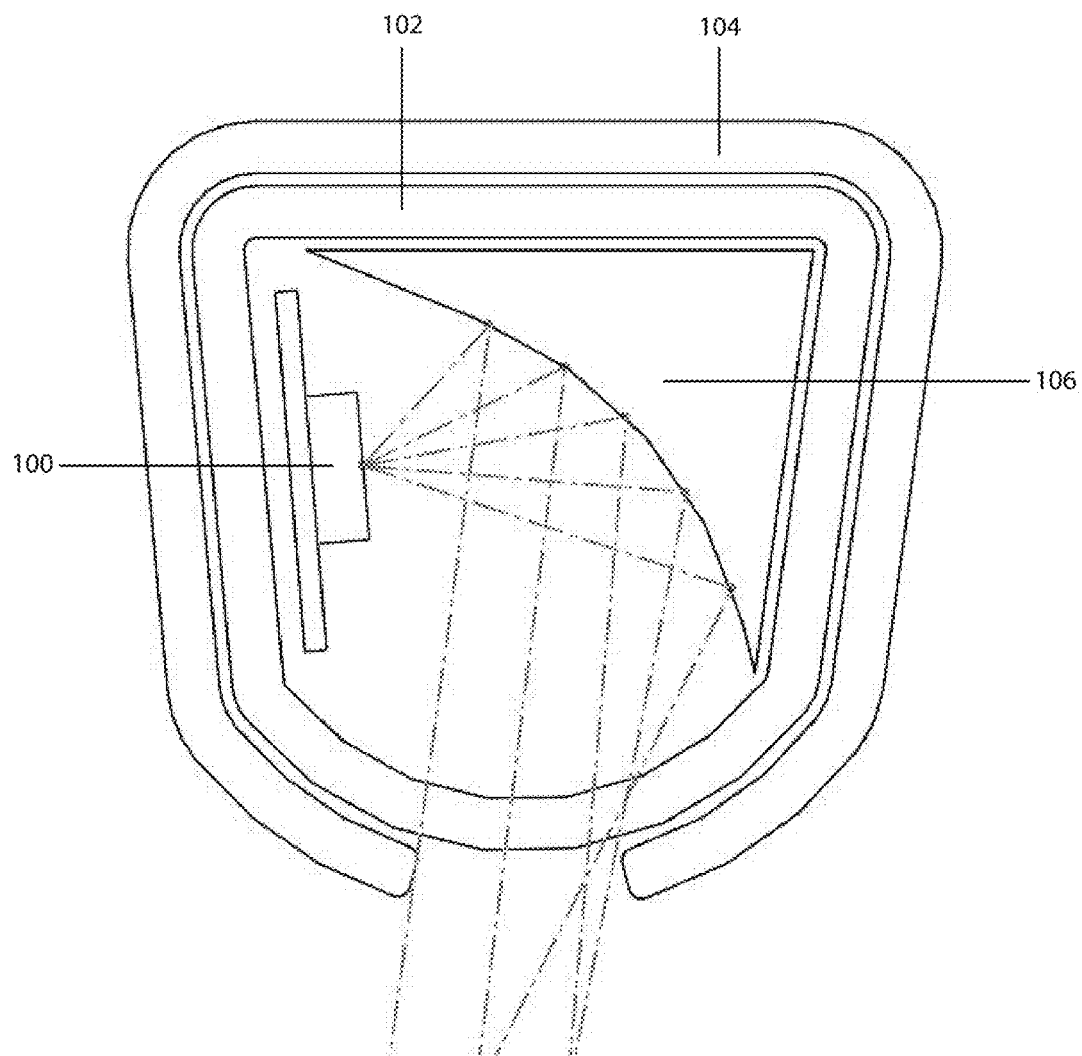
FIG. 6 of the drawings is a side view of an alternative embodiment of a vehicular approach lighting assembly manufactured in accordance with the present invention.
Figure 7:
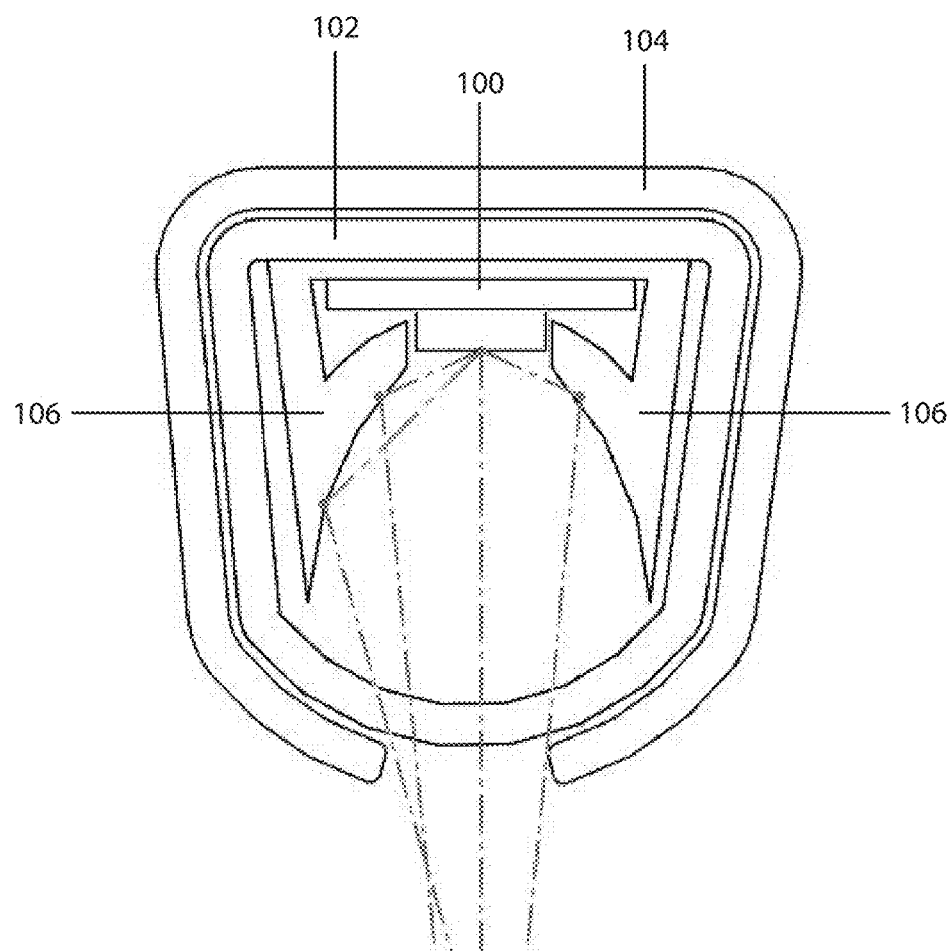
FIG. 7 of the drawings is a side view of an alternative embodiment of a vehicular approach lighting assembly manufactured in accordance with the present invention.

As is best shown in FIGS. 6-7 the lighting sub-assembly may further comprise one or more reflectors 106 positioned within the translucent jacket.

Figure 8:
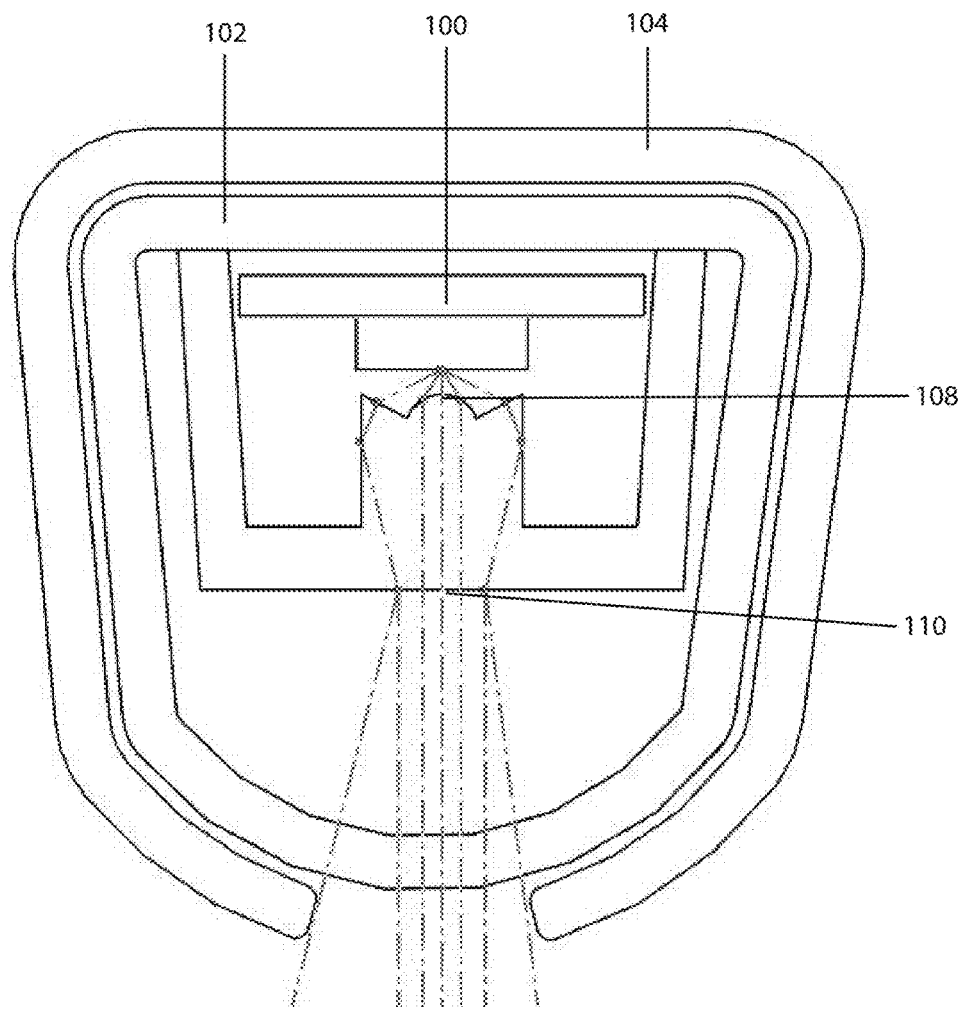
FIG. 8 of the drawings is a side view of an alternative embodiment of a vehicular approach lighting assembly manufactured in accordance with the present invention.

Referring now to FIG. 8, the lighting sub-assembly may also and/or alternatively include columnating lens 108 optionally associated with diffusing surface 110.

It will be understood that the lighting sub-assembly embodiments disclosed in FIGS. 6-8, provide a plurality of indirect and/or augmented light rays which can further enhance the user experience based upon preferred optical parameters.

In operation, a user can efficiently install a vehicular approach lighting assembly onto an undercarriage of a vehicle body by following the steps of: (a) providing at least two bracket sub-assemblies as disclosed herein; (b) securing the at least two bracket sub-assemblies to the undercarriage of a vehicle body through a plurality of drain apertures; and (c) securing a light sub-assembly within the at least two bracket sub-assemblies.

The foregoing description merely explains and illustrates the invention and the invention is not limited thereto except insofar as the appended claims are so limited, as those skilled in the art who have the disclosure before them will be able to make modifications without departing from the scope of the invention.

What is claimed and desired to be secured by Letters Patent of the United States is:

1. A mounting bracket sub-assembly used to mount a vehicular approach lighting assembly, comprising:
a base member, wherein the base member is adapted for securement to a drain aperture located on an undercarriage of a vehicle body;
a cover member, wherein the cover member mates with the base member to secure a vehicular approach lighting assembly; and
at least one fastener, wherein the at least one fastener releasably secures the cover member to the base member.

2. The mounting bracket sub-assembly according to claim 1, wherein the base member includes a top wall having an inner surface and an outer surface, a left side wall having an inner surface and an outer surface, a right side wall having an inner surface and an outer surface, a bottom wall having an inner surface and an outer surface, and a locking tab having an inner surface and an outer surface, wherein the locking tab emanates from the right side wall.

3. The mounting bracket sub-assembly according to claim 2, wherein the base member further includes at least one lock-washer tab having an inner surface and an outer surface, and wherein the at least one lock-washer tab is adapted to be positioned through a drain aperture located on an undercarriage of a vehicle body.

4. The mounting bracket sub-assembly according to claim 3, wherein the base member further includes a pair of lock-washer tabs having inner surfaces and outer surfaces, and wherein the pair of lock-washer tabs are adapted to be positioned through a drain aperture located on an undercarriage of a vehicle body.

5. The mounting bracket sub-assembly according to claim 4, wherein the top wall of the base member includes a sloped annular sidewall that defines an aperture for flush or sub-flush securing a threaded fastener therein.

6. The mounting bracket sub-assembly according to claim 5, wherein the bottom wall of the base member includes an aperture for securing a threaded fastener therein.

7. The mounting bracket sub-assembly according to claim 6, wherein the cover member includes a bottom wall having an inner surface and an outer surface, a step positioned between a left segment and a right segment, a right side wall having an inner surface and an outer surface, and a step positioned between an upper segment and a lower segment.

8. The mounting bracket sub-assembly according to claim 7, wherein the left segment of the bottom wall of the cover member includes an aperture for securing a threaded fastener therein.

9. The mounting bracket sub-assembly according to claim 8, wherein the upper segment of the right side wall of the cover member includes an aperture for receiving a locking tab of the base member.

10. The mounting bracket sub-assembly according to claim 9, wherein the bottom wall of the cover member includes an aperture positioned between the two steps for enabling light to transmit therethrough.

11. A vehicular approach lighting assembly, comprising:
a bracket sub-assembly according to claim 10; and
a light sub-assembly comprising;
    a light element extending for a length and configured to project light in an outward direction;
    a translucent jacket positioned exterior to and surrounding at least a portion of the light element, the translucent jacket having a hollow interior and an opening at each end; and
    an outer housing extending for a length and positioned exterior to and surrounding at least a portion of the translucent jacket.

12. The vehicular approach lighting assembly according to claim 11, wherein the lighting sub-assembly further comprises a reflector positioned within the translucent jacket.

13. The vehicular approach lighting assembly according to claim 11, wherein the lighting sub-assembly further comprises a pair of reflectors positioned within the translucent jacket.

14. The vehicular approach lighting assembly according to claim 11, wherein the lighting sub-assembly further comprises a lens positioned within the translucent jacket.

15. The vehicular approach lighting assembly according to claim 11, wherein the light element comprises a flexible LED linear light.

16. The vehicular approach lighting assembly according to claim 11, wherein the translucent jacket is fabricated from a thermoplastic.

17. The vehicular approach lighting assembly according to claim 16, wherein the thermoplastic comprises an aliphatic polyamide and/or a semi-aromatic polyamide.

18. The vehicular approach lighting assembly according to claim 11, wherein the translucent jacket is fabricated from an acrylate, a poly(methyl methacrylate), an acrylic, a polycarbonate, an acrylonitrile butadiene styrene, a copolyester, a polystyrene, a high impact polystyrene, a polyphenylene oxide, a polyethylene terephthalate, a polyethylene, a polyvinyl chloride, a polypropylene, and/or a polylactic acid.

19. The vehicular approach lighting assembly according to claim 11, wherein the outer housing is fabricated from aluminum.

20. A method for installing a vehicular approach lighting assembly onto an undercarriage of a vehicle body, comprising the steps of:
providing at least two bracket sub-assemblies according to claim 10;
securing the at least two bracket sub-assemblies to the undercarriage of a vehicle body through a plurality of drain apertures; and
securing a light sub-assembly within the at least two bracket sub-assemblies.

\* \* \* \* \*